(12) United States Patent
Attimont et al.

(10) Patent No.: US 6,629,180 B1
(45) Date of Patent: Sep. 30, 2003

(54) METHOD OF PERFORMING A TASK IN REAL TIME BY A DIGITAL SIGNAL PROCESSOR

(75) Inventors: Luc Attimont, Saint Germain en Laye (FR); Jannick Bodin, Garches (FR)

(73) Assignee: Alcatel, Paris (FR)

( * ) Notice: Subject to any disclaimer, the term of this patent is extended or adjusted under 35 U.S.C. 154(b) by 589 days.

(21) Appl. No.: 09/594,079

(22) Filed: Jun. 15, 2000

(30) Foreign Application Priority Data

Jun. 24, 1999 (FR) .............................. 99 08072

(51) Int. Cl.⁷ .............................. G06F 13/24
(52) U.S. Cl. .......................... 710/262; 710/49
(58) Field of Search ................ 710/260, 262, 710/266, 5, 6, 48, 49; 709/100, 102, 107; 712/35

(56) References Cited

U.S. PATENT DOCUMENTS

| 4,912,628 A | * 3/1990 | Briggs ........................ 709/100 |
| 5,146,595 A | 9/1992 | Fujiyama et al. |
| 5,404,536 A | 4/1995 | Ramakrishnan et al. |
| 5,530,597 A | 6/1996 | Bowles et al. |
| 5,708,814 A | 1/1998 | Short et al. |
| 6,496,847 B1 | * 12/2002 | Bugnion et al. ................ 709/1 |

FOREIGN PATENT DOCUMENTS

EP     0 617 361 A2    9/1994

* cited by examiner

*Primary Examiner*—Xuan M. Thai
(74) *Attorney, Agent, or Firm*—Sughrue Mion, PLLC

(57) ABSTRACT

The invention relates to a method of executing a real-time task by a digital signal processor using a cache memory, an overall duration being allocated for executing said task and any interrupts coming from peripherals associated with the processor, wherein the overall duration is subdivided into a plurality of time intervals comprising at least one masked period during which said task is executed and interrupts are made to wait and are grouped together, and at least one non-masked period during which said task is suspended and the group of interrupts is executed. The masked periods and the non-masked periods are defined by a hardware mechanism including a timer.

12 Claims, 1 Drawing Sheet

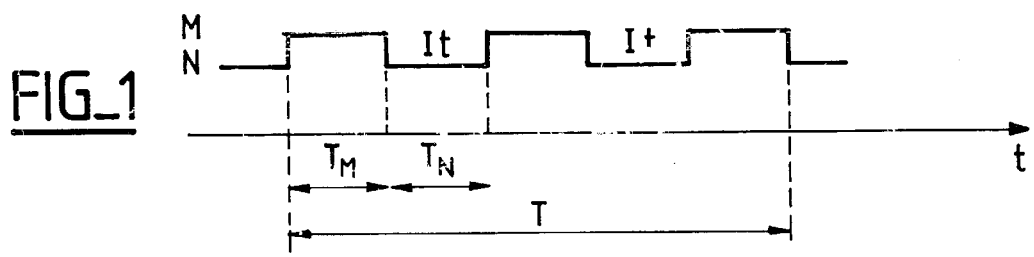
FIG_1
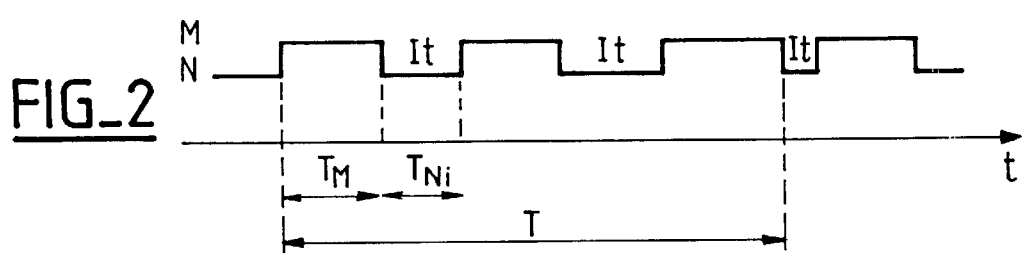
FIG_2
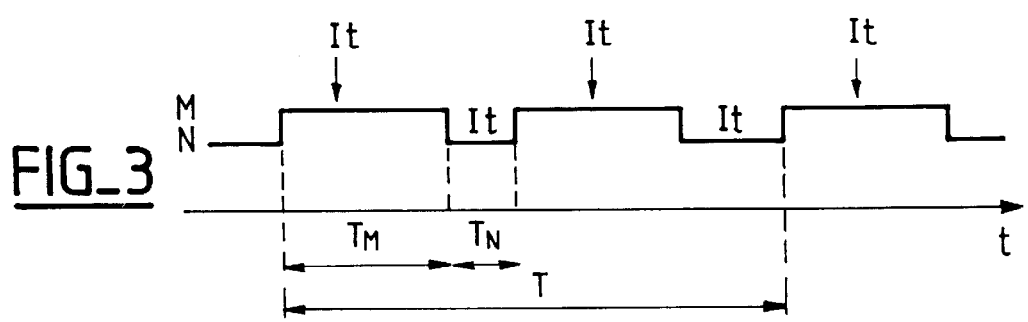
FIG_3
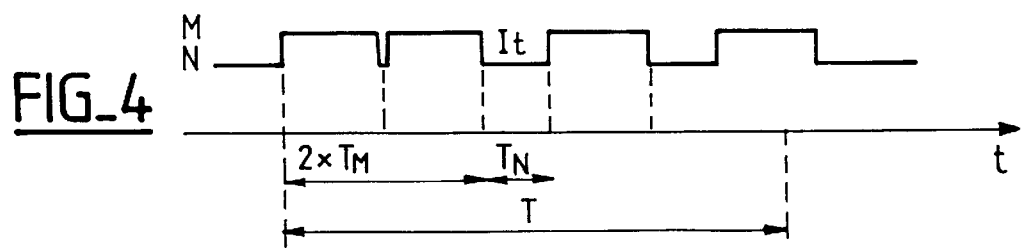
FIG_4

METHOD OF PERFORMING A TASK IN REAL TIME BY A DIGITAL SIGNAL PROCESSOR

The invention relates to a method of managing interrupts coming from peripherals associated with a digital signal processor (DSP) that uses a cache memory when executing real-time tasks.

A particular application of the invention lies in voice processing for telephone transmission, for example, such as that used by the global system for mobile communication (GSM), but also in processing and transmitting images in real time.

BACKGROUND OF THE INVENTION

Certain definitions are given below.

A digital signal processor (DSP) is a powerful computational unit suitable for performing tasks in real time, i.e. within a certain fixed time interval. Such a DSP is thus used to compress and decompress voice during a GSM telephone call, for example, or to perform speech recognition, or to process any digital signal such as an image, or some other signal.

Real-time tasks are generally subdivided into samples. For example, in the GSM application, voice is decompressed on the basis of samples taken over 20 ms for transmission in packets.

A DSP advantageously makes use of a cache memory.

Such a memory is configured to copy automatically the memory which is being read by the processor. It has the characteristic of being small but fast.

When the processor performs a loop in its program, and requests the same memory location on several occasions, the cache memory responds more quickly than the external main memory and gives the processor a copy of the previously used data.

The cache memory operates automatically and thus gives the impression of the external main memory being very fast.

This memory is transparent to the processor and hides the external main memory but not the inputs/outputs. Thus, when an interrupt appears, the cache memory takes account thereof.

An interrupt serves to interrupt the normal flow of the program to indicate that urgent processing needs to be performed. The arrival of an interrupt diverts the processor to an interrupt handler which saves the execution context of the current program and processes the interrupt.

Like the main program, interrupt execution also makes use of the cache memory. The cache memory is thus partially or completely emptied of the current data and program code so as to be filled with data and code for the interrupt to be processed.

When the DSP returns to the program for executing the real-time task, the cache memory consequently needs to be refilled with program data and code.

Such reloading is necessarily expensive in time. Unfortunately, time is particularly precious in a real-time application.

Until now, DSPs have used their own memory to maintain their real-time constraints. In addition, they have been subjected to few interrupts, essentially only to an interrupt indicating that the next voice sample is ready.

Nowadays, the tasks conferred on DSPs are being developed as options are added to main apparatuses.

Thus, ever more varied tasks such as hands-free operation, speech recognition, graphics processing, etc., are being added to the main task of voice processing.

Since the DSP is a powerful computational machine, it can also be used for graphics processing, such as displaying an image from the Internet, for example.

Some of these functions, such as image display or graphics functions require the DSP to access the external main memory. Furthermore, the code executed by the DSP can advantageously be stored in the external main memory, thereby enabling said code to be updated more easily. It is therefore essential to use the cache memory which is loaded with the code and data accessed by the DSP in the main memory to enable processing to be performed more quickly.

In addition to real-time processing, such as voice compression, and processing which is not real time, such as graphics functions, the DSP must also perform processing that corresponds to interrupts. For example, with Internet telephony, the DSP must simultaneously process voice compression and decompression and also the interrupts that come from the serial line that delivers a continuous stream of bytes from the modem.

On each interrupt, the code and the data of the interrupt replace some or all of the code or data associated with the real-time processing in the cache memory. Thus, after each interrupt, the DSP must reload its cache memory with the code and data relating to the program for executing the real-time task. This necessarily gives rise to significant slowing down, particularly when the number of interrupts is high, and real-time processing is then no longer guaranteed.

Several solutions have already been proposed in the prior art for guaranteeing real-time processing of the main task.

A first solution consists in masking interrupts throughout the time the main task is being executed by the DSP.

Such a solution requires peripherals to be dimensioned so that they have local memory capable of storing all the data relating to interrupts throughout the masking time. For example, a communications peripheral must store in local memory the data emitted or received during the interrupt masking time.

If the real-time task that the DSP is to perform is known, for example voice compression, it is possible to determine in advance the time required to execute this task and thus to determine the maximum interrupt masking time. It is then possible to dimension the peripherals so that they can accommodate response latency corresponding to the masking time. Nevertheless, when multimedia tasks are performed, it becomes necessary to dimension the peripherals for the largest conceivable amount of multimedia processing, so the resulting systems are expensive.

If it is decided not to store data in peripherals during the interrupt masking time, then hardware mechanisms must be provided that give direct access to the main memory so as to enable the data streams relating to the peripherals to be stored in buffer memories or directly in main memories.

Such a solution can be envisaged, but it makes the system complex and expensive, having peripherals that are more powerful than is necessary.

A second solution proposed in the prior art consists in locking the cache memory so as to prevent it losing its contents.

Thus, after the first trip round the main program loop of the DSP, the cache memory is locked. When interrupts occur, they are processed without using the cache memory.

Unfortunately, that solution presents numerous drawbacks.

Firstly, in the event of the DSP processing an algorithm that contains conditional tests subdividing the program into a plurality of processing branches it can be difficult to load the main program into the cache memory before it becomes locked; in addition, locking the cache memory amounts to transforming it into a local memory that is loaded manually. This loses the advantages associated with a cache memory.

Secondly, interrupt processing is slowed down by being prevented from using the cache memory.

Furthermore, in the context of a wireless application (such as GSM), access to the external memory is expensive in terms of energy and thus has an impact on the battery charge life of the apparatus.

That solution of locking the cache memory during processing of the real-time task is therefore not optimal.

A third solution consists in using a memory management unit (MMU).

The MMU specifies which data can be cached, such as memory data, and which data is unsuitable for caching, such as inputs/outputs, and which data can be modified by a microcontroller. The MMU can require the code and data associated with interrupts to be non-cachable. Thus, during execution of an interrupt, the associated data is considered as being temporary and is not put into the cache memory.

That solution suffers from a major drawback because interrupts do not benefit from the advantages of a cache memory, and that can cause processing to be slowed down considerably, with the direct consequence of increasing the overall time required for the DSP to process the main task.

Another method proposed in the prior art consists in overdimensioning the system so that the DSP can maintain real time even if the cache memory is constantly being emptied by interrupts.

That solution can be suitable for a PC type computer since the processor is often under-utilized, but it is not suitable for a mobile telephone applying the GSM standard.

The solutions proposed in the prior art do not make it possible to guarantee that a real-time task is processed by the DSP and that interrupts are taken into account quickly.

In general those solutions are radical solutions consisting in overdimensioning the system.

The solutions proposed are often theoretical but economically unsuitable for an environment in which costs must be optimized.

OBJECTS AND SUMMARY OF THE INVENTION

An object of the present invention is to mitigate the drawbacks of the prior art and to propose a novel way of managing DSP interrupts, which is economical and does not require the system to be overdimensioned.

The invention proposes a solution in which the cache memory is accessible to interrupts as it is to the main program.

In the invention, the interrupts are grouped together in stacks so as to be processed in groups, so that so far as the OSP is concerned, the cache memory is emptied and refilled only once per group of interrupts.

The number of interrupt groups is necessarily smaller than the number of interrupts, which can give rise to a significant saving in time overall when processing the main task in real time.

More particularly, the present invention provides a method of executing a real-time task by a digital signal processor using a cache memory, an overall duration being allocated for executing said task and any interrupts coming from peripherals associated with the processor, wherein the overall duration is subdivided into a plurality of time intervals comprising at least one masked period during which said task is executed and interrupts are made to wait and are grouped together, and at least one non-masked period during which said task is suspended and the group of interrupts is executed, the masked periods and the non-masked periods being defined by a hardware mechanism including a timer.

According to a feature of the invention, the duration of the masked periods is set by the timer.

In a first implementation, the timer is periodically reset.

In a second implementation, the timer is automatically reset after the pending group of interrupts has been processed.

In a variant implementation, the timer is reset by processing the last interrupt of the pending group.

In a third implementation, the timer is reset by causing the first interrupt to wait.

In a preferred implementation, the timer is reset automatically if there is no pending interrupt at the end of the timed period.

According to a characteristic of the invention, the duration of the masked periods corresponds to the shortest latency time of the peripherals associated with the processor.

In a particular implementation, the duration of the masked periods is set at 1 ms.

In a particular implementation, the overall execution time for a sample of the real-time task is set at 20 ms.

The invention presents the advantage of being simple to implement and it provides a low-cost solution to the problem of processing a real-time task by a DSP regardless of the number of interrupts that might occur during said processing.

The invention does not require any overdimensioning of the system.

The invention seeks essentially to optimize the processing of the real-time task by limiting the number of times the cache memory is reloaded.

BRIEF DESCRIPTION OF THE DRAWINGS

Other advantages and features of the invention will appear more clearly on reading the following description which is given by way of illustrative and non-limiting example and with reference to the accompanying drawing, in which:

FIG. 1 is a timing diagram of periods during which interrupts are masked and unmasked in a first implementation of the invention;

FIG. 2 is a timing diagram of periods during which interrupts are masked and unmasked in a second implementation of the invention;

FIG. 3 is a timing diagram of periods during which interrupts are masked and unmasked during a third implementation of the invention; and FIG. 4 is a timing diagram of periods during which interrupts are masked and unmasked in a variant implementation of the invention.

MORE DETAILED DESCRIPTION

The invention is based on the idea of grouping together interrupts that occur during the processing of a real-time task by the DSP so that the interrupts can be processed one after another prior to returning to the real-time task, and so as to reload the cache memory only after each group of interrupts has been processed instead of after processing each interrupt.

The interrupts are grouped together by masking them in a first period as is known in the prior art.

The invention consists in unmasking interrupts while processing the main real-time tasks so as to enable the interrupts to be processed, and then in masking them again for a given length of time.

The maximum time required for processing the real-time task is estimated by estimating the number of times the cache memory is emptied and then reloaded.

It is possible to discover the number of interrupts that occur during the processing of a DSP task, but that is not completely optimal.

Interrupts are associated with peripherals which are in turn associated with data streams each having some maximum data rate. Consequently, interrupts have a maximum rate.

In particular the following relationship applies:

$$T = T_{DSP} + T_{it} + T_{cache}$$

where:

T=overall execution time for the real-time task;
$T_{DP}$=time required by the DSP to execute the task;
$T_{it}$=interrupt execution time; and
$T_{cache}$=time required to reload the cache memory.

The invention seeks to minimize $T_{cache}$ so as to comply with the time set by T which corresponds to the sampling period of the real-time task.

To do this, the invention proposes a hardware mechanism having means for masking interrupts and means for generating a time delay by associating a clock with counter-means.

Interrupt masking is thus limited in time. The maximum time required for executing the real-time task is determined and subdivided into time intervals comprising masked periods $T_M$ and non-masked periods $T_N$.

The total time T required for executing the DSP task comprises masked periods $T_M$ during which said task is executed, and the interrupts are grouped together in stacks and left pending, and non-masked periods $T_N$ during which the DSP task is interrupted and the interrupts are processed in priority order.

The real-time main task of the DSP is executed during the masked periods $T_M$. During these periods, interrupts are left pending. In a preferred implementation, the masked periods $T_M$ are determined by a hardware timer mechanism based on a clock which unmasks the interrupt at the end of its stroke.

The interrupts are then processed during said non-masked periods $T_N$, after which the timer is restarted to measure out a new masked period $T_M$.

Various mechanisms can be envisaged for masking and unmasking interrupts.

Firstly, the timing can be cyclical with interrupts being masked and unmasked in a regular manner, with a masking period corresponding to the shortest latency time of the peripherals.

In a first implementation, shown in FIG. 1, the timer is reset regularly to time a masked period $T_M$.

The interrupts It are left pending during this period and they are executed during the non-masked periods $T_N$.

This implementation with masked and non-masked periods being measured out is not optimal since it requires the non-masked periods $T_N$ to be dimensioned to accommodate the longest conceivable interrupt execution time.

In another implementation, shown in FIG. 2, the timer is reset automatically by hardware at the end of interrupt mode operation so as to begin measuring out a new masked period $T_M$.

It is also possible to envisage resetting the timer by a "scan" interrupt having very low priority and which comes after all the pending interrupts.

The duration of non-masked periods $T_{Ni}$ is therefore variable and depends on the interrupts to be processed.

In another implementation, shown in FIG. 3, the timer is reset to measure out a masked period $T_M$ whenever the first interrupt It occurs.

This embodiment makes it possible to allocate a maximum amount of time to processing the real-time main task of the DSP.

In a variant implementation, shown in FIG. 4, regardless of the mechanism selected for resetting the timer, the timer restarts counting from zero for a new masked period $T_M$ if there is no pending interrupt at the end of the timed period.

In a particular implementation, the overall duration T of the DSP task is set at 20 ms, which advantageously corresponds to a voice sample in the context of a GSM application.

The duration of the masked periods $T_M$ defined by the timer is preferably fixed at 1 ms, and the duration of the non-masked periods $T_N$ depends on the particular implementation selected.

What is claimed is:

1. A method of executing a real-time task by a digital signal processor using a cache memory, an overall duration being allocated for executing said task and any interrupts coming from peripherals associated with the processor, wherein the overall duration is subdivided into a plurality of time intervals comprising at least one masked period during which said task is executed and interrupts are made to wait and are grouped together, and at least one non-masked period during which said task is suspended and the group of interrupts is executed.

2. A method of executing a task by a DSP in accordance with claim 1, wherein the masked periods and the non-masked periods are defined by a hardware mechanism.

3. A method of executing a task by a DSP according to claim 2, wherein the hardware mechanism comprises a timer.

4. A method of executing a task by a DSP according to claim 3, wherein the duration of the masked periods is fixed by the timer.

5. A method of executing a task by a DSP according to claim 3, wherein the timer is periodically reset.

6. A method of executing a task by a DSP according to claim 3, wherein the timer is automatically reset after the pending group of interrupts has been processed.

7. A method of executing a task by a DSP according to claim 3, wherein the timer is reset by processing the last interrupt of the group.

8. A method of executing a task by a DSP according to claim 3, wherein the timer is reset by causing the first interrupt to wait.

9. A method of executing a task by a DSP according to claim 3, wherein the timer is reset automatically if there is no pending interrupt at the end of the timed period.

10. A method of executing a task by a DSP according to claim 1, wherein the duration of the masked periods corresponds to the shortest latency time of the peripherals associated with the processor.

11. A method of executing a task by a DSP according to claim 10, wherein the duration of the masked periods is set at 1 ms.

12. A method of executing a task by a DPS according to claim 1, wherein the overall execution time for a sample of the real-time task is set at 20 ms.

* * * * *